United States Patent [19]

Plaiss

[11] 4,022,486
[45] May 10, 1977

[54] LOCK

[76] Inventor: Charles E. Plaiss, 6834 W. Devon Ave., Chicago, Ill. 60631

[22] Filed: May 27, 1975

[21] Appl. No.: 580,938

Related U.S. Application Data

[63] Continuation-in-part of Ser. No. 504,537, Sept. 16, 1974, abandoned.

[52] U.S. Cl. .............................. 280/289 L; 70/183; 70/227; 70/233; 70/371; 70/379 R; 292/DIG. 16

[51] Int. Cl.² ...................... B62H 5/06; B62H 5/16; E05B 71/00

[58] Field of Search ............ 280/289 L; 70/58, 168, 70/183, 227, 233, 234, 371, 379 R; 85/3 R, 3 S, 3 K, 66; 292/19, 20, 81, DIG. 16

[56] References Cited

UNITED STATES PATENTS

| 585,054 | 6/1897 | Stevens | 70/233 |
|---|---|---|---|
| 1,691,975 | 11/1928 | Irwin | 70/168 |
| 1,998,512 | 4/1935 | Manton | 70/185 |
| 2,061,638 | 11/1936 | Segal | 70/371 |
| 2,081,778 | 5/1937 | Taman | 70/187 |
| 2,544,590 | 3/1951 | Dyson et al. | 70/187 |
| 3,625,031 | 12/1971 | Alley | 70/58 |
| 3,785,183 | 1/1974 | Sander | 70/58 |
| 3,785,676 | 11/1974 | Klein, Jr. | 280/289 L |

FOREIGN PATENTS OR APPLICATIONS

| 899,163 | 5/1945 | France | 280/289 L |
|---|---|---|---|
| 808,414 | 7/1951 | Germany | 280/289 L |
| 511,361 | 8/1938 | United Kingdom | 70/183 |
| 24,308 | 11/1907 | United Kingdom | 70/371 |

Primary Examiner—Robert R. Song
Assistant Examiner—Jack D. Rubenstein
Attorney, Agent, or Firm—Rummler & Snow

[57] ABSTRACT

A removable lock primarily designed for bicycles or the like which is incorporated in the tubular head or sleeve and extends interiorly into the tubular steering stem or post, the lock including tumblers, a stationary housing and an interiorly positioned rotary shaft associated with said tumblers including a pair of spring arms which wind around the shaft in inoperative position and extend outwardly in operative position through said housing interiorly of said stem to prevent rotation of the steering post and withdrawal of the lock. Means are also provided for anchoring a wire rope or restraint on the lock to effectively prevent rotation of the wheels, etc.

4 Claims, 11 Drawing Figures

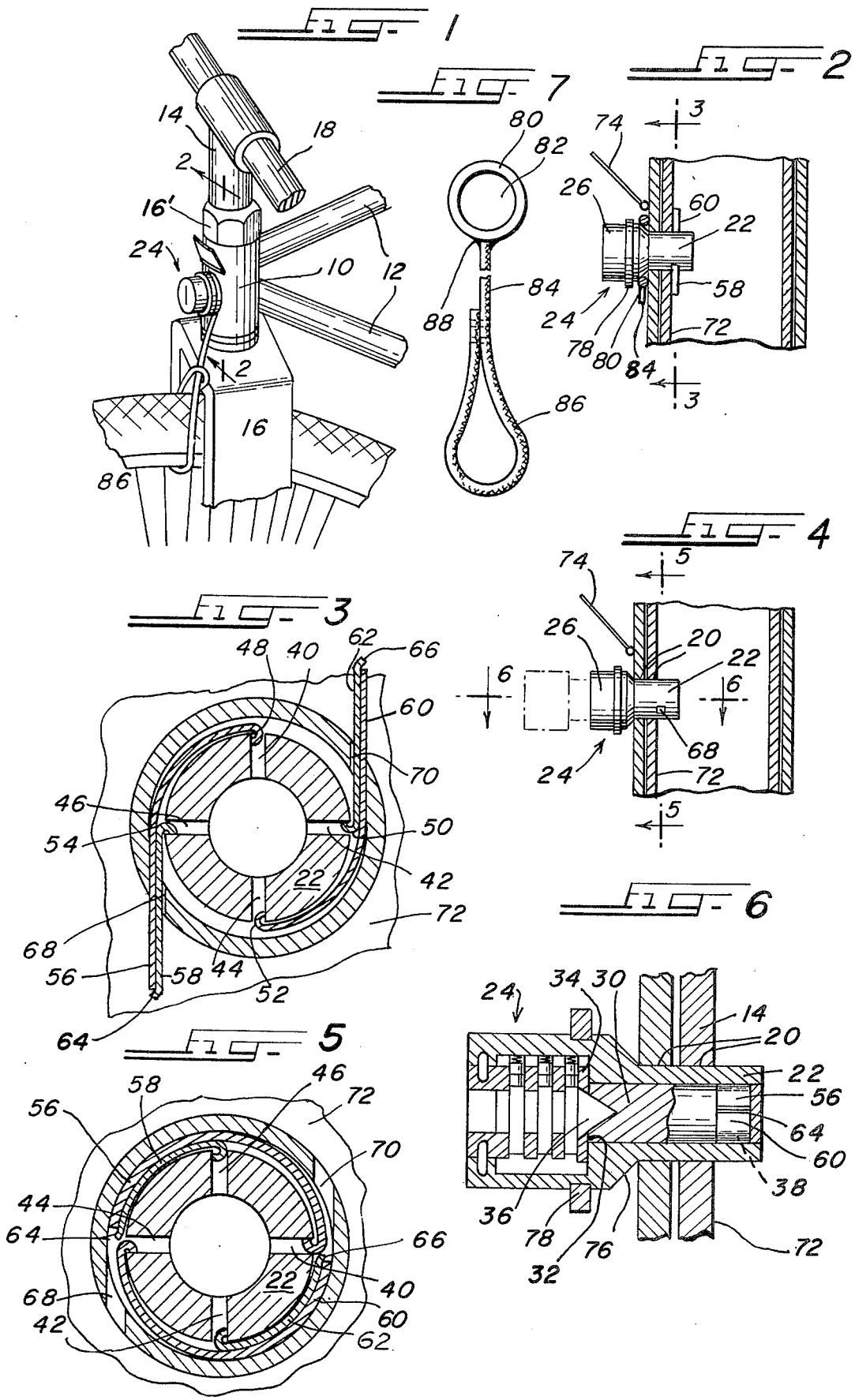

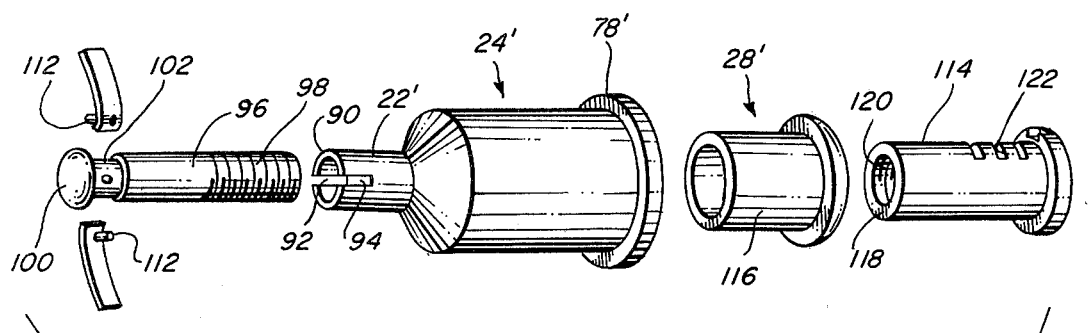
FIG-8
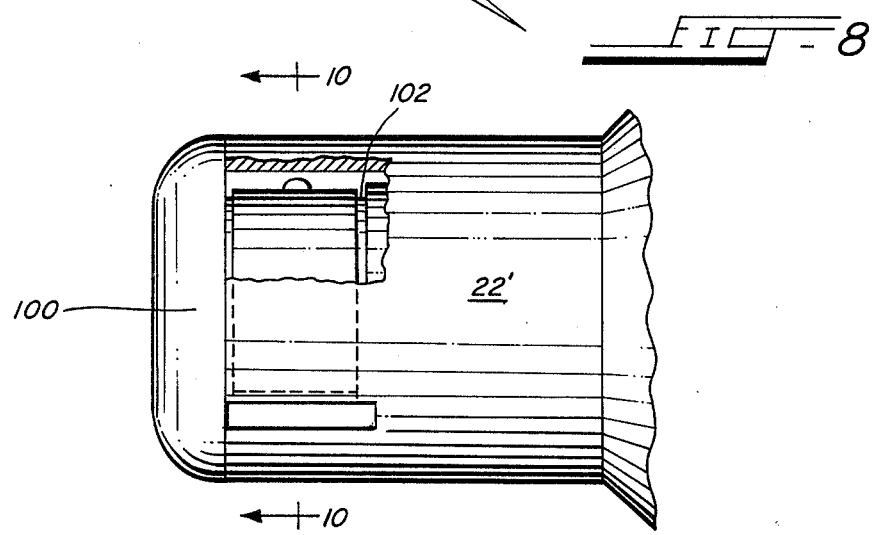
FIG-9
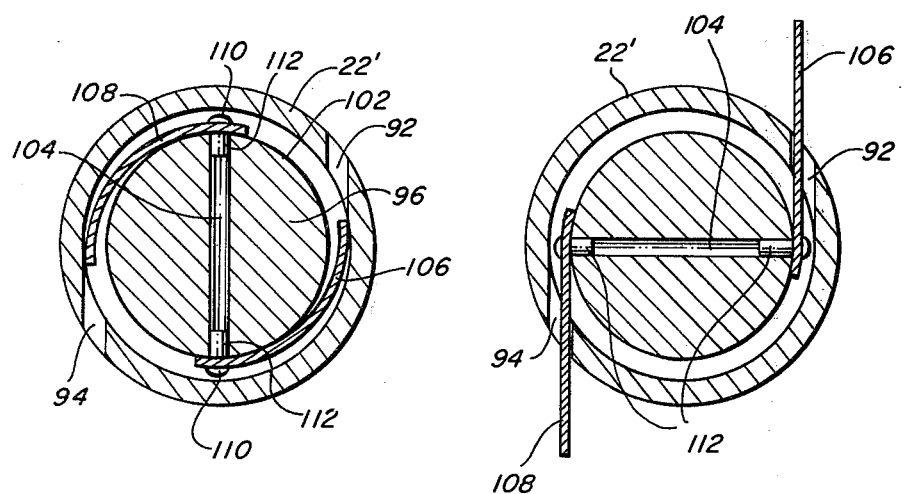
FIG-10
FIG-11

4,022,486

1

LOCK

This application is a continuation-in-part of my copending application Ser. No. 504,537 filed Sept. 16, 1974, now abandoned.

BACKGROUND OF THE INVENTION

Most locks for bicycles comprise a chain and a padlock to prevent theft of the bicycle. Other patents disclose complicated structures mounted in the header of the front fork, such as U.S. Pat. Nos. 2,081,778 and 2,544,590. Others have locks located in the crank hanger, i.e. U.S. Pat. No. 704,655, and two have locks in the head or sleeve, U.S. Pat. Nos. 1,998,512 and 977,533. It was to overcome the deficiencies of bicycle locks that the very simple lock of the present invention was conceived.

SUMMARY OF THE INVENTION

A removable lock for mounting in and to the head and the hollow steering stem post of a bicycle having an aperture drilled through the walls thereof in registry with each other to expose the interior of the post for the reception of a stepped housing having a latching means such as a cylinder lock, the end of which contains a rotary rod or shaft to which the ends of two pairs of springs (or a pair of springs) are anchored to the free end thereof wound therearound and within the housing, and the housing having a pair of opposed openings adjacent its free end through which the springs extend into the interior of the post upon actuation of the rotary rod for locking the steering apparatus and preventing unauthorized removal. Means are provided on the lock for accommodating a restraint to prevent rotation of the bicycle wheels or anchoring the bicycle to a solid structure.

BRIEF DESCRIPTION OF THE DRAWINGS

FIG. 1 is a perspective view of the forepart of a bicycle illustrating the steering apparatus, the head and stem on which the present invention is positioned, parts being shown broken away;

FIG. 2 is a cross-sectional view taken on the lines 2—2 of FIG. 1;

FIG. 3 is an enlarged cross-sectional view taken on the lines 3—3 of FIG. 2;

FIG. 4 is a vertical cross-sectional view showing the lock in operative position apart from the stem of the steering apparatus;

FIG. 5 is an enlarged cross-sectional view taken on the lines 5—5 of FIG. 4;

FIG. 6 is a greatly enlarged cross-sectional view taken on the lines 6—6 of FIG. 4;

FIG. 7 is an elevational view of a wire rope for use with the present invention;

FIG. 8 is an exploded perspective view of a modified form of my invention;

FIG. 9 is a fragmental side elevational view of the housing showing the stepped portion thereof of FIG. 8, with parts broken away to disclose the interior mechanism;

FIG. 10 is a cross-sectional view taken on the lines 10—10 of FIG. 9 illustrating the springs in inoperative position; and FIG. 11 is a cross-sectional view similar to FIG. 10 but showing the springs in operative position.

DETAILED DESCRIPTION OF THE DRAWINGS

The forepart of a bicycle, as shown in FIG. 1, includes the tubular head or sleeve 10 supported by the frame members 12 into which a portion of the hollow rotary stem 14 of the fork 16 is positioned. The stem 14 is held in the sleeve 10 by the usual nut and locking ring 16' and also supports the handlebars 18 on its upper end.

The wall of the head or sleeve 10 and the stem 14 are bored simultaneously to expose the interior of the stem. The bore is preferably a 0.375 inch aperture as shown at 20 to receive the stepped portion 22 of the lock housing 24. The stepped portion 22 has an approximate length of 0.625 inches and an approximate outside diameter of 0.371 inches for ready insertion through the bores 20.

The other or larger end 26 of the hollow lock housing 24 has an approximate outside diameter of 0.375 inches and a length of approximately 0.375 inches and houses a set of tumblers 28 axially therein of the usual and ordinary type.

A stepped rotary shaft 30 is rotatively positioned axially in the interior of the stepped portion 22 of the housing 24 and, as shown in FIG. 6, is cooperatively anchored at its left hand end 32 to the right hand disk 34 of the tumbler mechanism in any suitable manner such as by welding or soldering or by screws whereby the V slot 36 extends from the end disk 34 into the shaft 30.

The opposite end of the shaft 30 is stepped at 38 and has four equi-spaced slots 40, 42, 44, 46 extending thereinto, as clearly shown in FIGS. 3 and 5. The bent ends 48, 50, 52, 54 of springs 56, 58, 60 and 62, respectively, are anchored in slots 40, 46, 44 and 42, respectively.

The springs 58 and 62 are shorter in length than the springs 56 and 60 so that when in open position (see FIG. 3), the terminal ends of the springs 56 and 58 (and the springs 60 and 62) will extend substantially equidistantly outwardly and the partially bent ends 64 and 66 (see FIGS. 3 and 5) of springs 58 and 62, respectively, will lie partially over the terminal ends of springs 56 and 60, respectively. As seen in FIG. 3, part of spring 56 lies against the face of spring 58 in extended position. The same is true of springs 60 and 62 to give strengthened rigidity to the extended springs. All four springs move, in either direction, simultaneously upon actuation of the shaft 30.

The stepped end of housing 22 is also provided with a pair of slots 68 and 70 through which the free ends of springs 56–58 and 60–62, respectively, extend through and outwardly thereof to bear against the inner wall 72 of the stem 14 (see FIGS. 2 and 3) to prevent withdrawal of the lock housing from the head 10 and stem 14. This occurs when the shaft 30 is rotated counter-clockwise by a proper key inserted in the tumbler lock and the V end of the key is seated in the V-slot 36. Thus the stem 14 cannot rotate as it is restrained by the stepped portion 22 as should be clear from viewing FIG. 4. It should be clear that since the springs are constructed of spring carbon steel, preferably blue tempered and polished, the faces of the springs will tend to follow the inner face of the stepped portion 30 and readily shift outwardly through the slots 68 and 70, respectively. The springs therefore act as a bolt.

By rotating the key clockwise, the springs will be withdrawn from the position shown in FIG. 3 and wound around the stepped portion 38, as shown in FIG. 5. Thus the entire housing may be withdrawn from the head or sleeve 10 and stem 14 and the stem 14 is free to rotate.

With the lock removed, a pivot cover 74 is provided to close the opening 20 to keep dirt and dust out of the interior of the head 10 and stem 14.

It is especially to be noted that the end of the large end 26 of the housing 24 is provided with a taper 76 in conical form extending towards the stepped end 22 and the large end may be provided with an integrally formed collar 78 closely adjacent the taper, the purpose of which will be hereinafter described.

A washer or ring 80 having an axial opening 82 of a diameter slightly smaller than or equal to the outside diameter of the large end of the housing 24 has one end of a wire rope 84 secured to one face of the washer 80 at 88. The opposite end of the wire rope 84 is formed with a permanent loop 86.

In use, the loop 86 is slipped through one or both wheels of the bicycle and/or around the frame members 12 and/or around a solid structure like a post. The washer 80 and free end of the rope are inserted through the loop 86, and positioned on the stepped end 22 of the housing which is partially inserted in the opening 20. Thus the washer will rest on the large end of the conical taper 76.

A collar 78 is integrally formed on the outer wall of the larger end of the housing 24 closely adjacent the large end of the taper. This is to serve as a stop to prevent the washer from slipping off the large end 26 of the housing when the lock is in locked position and when the aperture or opening 82 becomes worn.

As should be clear from the aforesaid dimensions, the entire lock is relatively small and may be kept stored in a person's pocket until needed.

In the modification shown in FIGS. 8–11, inclusive, the lock housing 24' is substantially identical to the lock housing 24 of the main embodiment but the terminal end 90 of the stepped portion 22' has a pair of aligned slots 92–92 drilled vertically in a plane normal to the axis of said portion 22', as shown in FIGS. 10 and 11.

The rotary shaft 96 is threaded as at 98 at one end, and at the other end is provided with crown 100 and a cylindrical groove or seat 102. The seat is drilled normal to the axis of the shaft medially of the side edges of the groove to form an aperture 104 extending through the groove 102.

A pair of springs 106–108 each have an aperture in one end for seating a headed pin 100, the shank 112 of which is force fitted into the aperture 104 as clearly seen in FIGS. 10 and 11. Thus the springs 106, 108 tend to lie in the groove in opposed alignment (see FIG. 10).

When assembled, the shaft 96 is positioned substantially within the interior of the stepped portion 22' of the housing 24'.

The lock tumbler housing 28' of the device is substantially the same as the portion 34 in the main embodiment except the tumbler cylinder 114 extends outwardly of its housing 116 with the end portion 118 partially bored and threaded axially as at 120 for the reception of the threaded end of shaft 96 (see FIG. 8) which compactly holds all the elements together. Once the elements are assembled at the factory, it will be difficult to separate them by the public.

It is also to be noted that the housing 24' contains a cylindrical shoulder 78' against which the shoulder 122 of the tumbler cylinder abuts.

When the proper key is inserted in the interior tumbler cylinder and shifted to rotate the tumbler cylinder about a quarter revolution, it causes the free ends of the springs 104, 106 to extend outwardly through the respective slots 92, 94, substantially the same as in the main embodiment.

Thus both embodiments are substantially identical in operation and perform the same function. The stepped portions 22, 22' are inserted in aligned apertures 20 of the sleeve 10 and stem 14, all as hereinabove described.

It should be understood that only a single elongated pin may be used instead of the two separate pins 112 to hold the springs 106, 108, with both ends of the elongated pin being crowned. Also, the ring 80 may be readily slipped on the housing 24' and be retained and/or anchored thereto.

It is to be understood that numerous details shown and described may be altered or omitted without departing from the spirit of this invention as defined by the following claims.

I claim:

1. A bicycle or the like having a hollow head, a tubular stem anchored to the upper end of the front wheel fork and handlebars secured to the other end of said stem, means to secure said stem to said head, and a common bore extending horizontally in said stem and head which extends interiorly into the stem, in combination with a lock to prevent rotation of said stem, said lock comprising a removable housing having a stepped portion, said stepped portion being insertable in and through the common bore and partially extending into the interior of said stem, a rotary shaft in said housing having a stepped portion, a set of tumblers operatively secured to one end of said shaft and positioned interiorly of said housing, means to actuate the same, said stepped portion of said shaft being of a diameter less than the inside diameter of the stepped portion of said housing adjacent the free end of said shaft, said stepped portion of said shaft having four slots therein extending toward the axis of said shaft and spaced equi-distantly apart, a plurality of spring means, one end of each of said spring means anchored in one of the slots and the remainder of said spring means wound partially around said stepped end of said shaft, a pair of slots in the stepped portion of said housing in cooperative relation and registry with the free ends of said spring means whereby, when the stepped portion of said lock housing is inserted in said bores and upon rotation of said shaft, the spring means will extend through and outwardly of said housing stepped portion and said springs will bear against the inner wall of said stem.

2. The device according to claim 1 wherein the housing is provided with a taper in conical form extending from the end of said tumbler housing to said stepped portion of said housing.

3. The device according to claim 2 wherein a ring is integrally formed on said tumbler housing adjacent the taper.

4. A bicycle or the like having a hollow head, a tubular stem anchored to the upper end of the front wheel fork and handlebars secured to the other end of said stem, means to secure said stem to said head, and a common bore extending horizontally in said stem and head which extends interiorly into the stem, in combination with a lock to prevent rotation of said stem, said locking comprising a removable housing having a stepped portion, said stepped portion being insertable in and through the common bore and partially extending into the interior of said stem, a set of tumblers in said housing, a rotary shaft in said housing having a stepped portion, said tumblers being operatively secured to one end of said shaft operatively secured and positioned interiorly of said housing, said stepped portion of said shaft having an outside diameter less than the inside diameter of the stepped portion of said housing adjacent the free end of said shaft, said stepped portion of said shaft having four slots therein extending toward the axis of said shaft and spaced equi-distantly apart, a plurality of spring means, one end of each of said spring means anchored in one of the slots and the remainder of said spring means wound partially around said stepped end of said shaft, a pair of slots in the stepped portion of said housing in cooperative relation and registry with the free ends of said spring means whereby, upon rotation of said shaft, the spring means will extend through and outwardly of said housing stepped portion and act as a lock bolt, when said stepped portion is inserted in and through said head and stem, the springs bearing against the inner wall of said stem adjacent the stem bore, a taper in conical form extending from the end of said tumbler housing to said stepped portion of said housing, a washerlike collar, one end of a wire rope integrally secured to said collar, a loop permanently formed on the free end of said wire rope, whereby said looped end of said rope may be threaded through the wheel and frame of said bicycle, and the collar end of said rope threaded through said looped end, and the stepped end of said lock housing threaded through the interior of said collar, and said lock housing secured to said head and stem.

* * * * *